United States Patent
Singh et al.

(10) Patent No.: US 12,488,362 B2
(45) Date of Patent: Dec. 2, 2025

(54) HIERARCHICAL NEURAL NETWORK BASED IMPLEMENTATION FOR PREDICTING OUT OF STOCK PRODUCTS

(71) Applicant: Salesforce, Inc., San Francisco, CA (US)

(72) Inventors: Akash Singh, Gurgaon (IN); Rajdeep Dua, Hyderabad (IN)

(73) Assignee: Salesforce, Inc.

( * ) Notice: Subject to any disclaimer, the term of this patent is extended or adjusted under 35 U.S.C. 154(b) by 881 days.

(21) Appl. No.: 17/675,817

(22) Filed: Feb. 18, 2022

(65) Prior Publication Data

US 2023/0267481 A1 Aug. 24, 2023

(51) Int. Cl.
| | | |
|---|---|---|
| *G06N 3/04* | (2023.01) | |
| *G06N 3/044* | (2023.01) | |
| *G06N 3/045* | (2023.01) | |
| *G06Q 10/087* | (2023.01) | |
| *G06Q 30/0202* | (2023.01) | |

(52) U.S. Cl.
CPC ......... *G06Q 30/0202* (2013.01); *G06N 3/044* (2023.01); *G06N 3/045* (2023.01); *G06Q 10/087* (2013.01)

(58) Field of Classification Search
CPC ............................. G06Q 10/087; G06N 3/045
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |

(Continued)

OTHER PUBLICATIONS

Xue, Ning, et al. "Evolving deep CNN-LSTMs for inventory time series prediction." 2019 IEEE Congress on Evolutionary Computation (CEC). IEEE, 2019. (Year: 2019).*

*Primary Examiner* — Hal Schnee
(74) *Attorney, Agent, or Firm* — Ingrassia Fisher & Lorenz, LLP (57) ABSTRACT

A hierarchical neural network for predicting out of stock products comprises an input layer that receives data from data sources that store disparate datasets having different levels of attribute detail pertaining to products for sale in stores of a retailer. A first level of neural networks processes the data from the data sources into respective learned intermediate vector representations. A second level comprises a concatenate layer that concatenates the learned intermediate vector representations from the second level into a combined vector representation. A third level comprises a feed forward network that receives the combined vector representation and outputs to the retailer an out of stock probability indicating which store and product combinations are likely to have out of stock products over a predetermined timeframe.

19 Claims, 6 Drawing Sheets

(56) References Cited

U.S. PATENT DOCUMENTS

| | | |
|---|---|---|
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 11,037,099 B2 | 6/2021 | Mustafi et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |

(56) References Cited

U.S. PATENT DOCUMENTS

| | | |
|---|---|---|
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0359537 A1 | 12/2014 | Jackobson et al. |
| 2020/0250715 A1 | 8/2020 | Mustafi et al. |
| 2021/0150273 A1 | 5/2021 | Mustafi et al. |
| 2021/0150548 A1 | 5/2021 | Dua et al. |
| 2021/0192540 A1 | 6/2021 | Madduri et al. |
| 2021/0240967 A1 | 8/2021 | Dua et al. |
| 2021/0287401 A1 | 9/2021 | Mustafi et al. |
| 2022/0180274 A1* | 6/2022 | Makhija ................. G06N 3/045 |
| 2022/0374827 A1* | 11/2022 | Lee ......................... G06F 17/12 |

\* cited by examiner

HIERARCHICAL NEURAL NETWORK BASED IMPLEMENTATION FOR PREDICTING OUT OF STOCK PRODUCTS

TECHNICAL FIELD

One or more implementations relate to the field of neural networks; and more specifically, to a hierarchical neural network based implementation for predicting out of stock products.

BACKGROUND ART

Consumer goods (CG) companies manufacture products and sells the products to consumers through varies retail chains or retailers. Each store of a retailer maintains product inventory and displays the various products on shelves inside the store for customer selection and purchase. The retail stores use an information technology (IT) system that places new orders when product inventory at a store falls below a certain level. But this does not always work as intended, as there may be a mismatch between the inventory levels in IT system and the actual inventory in the backstore. When a given product is no longer present on any display shelf in a given retail store or in inventory, an out of stock (OOS) event for that product and store occurs.

The retailer usually does not takes immediate action to fix and OOS event for a single product for several reasons. For example, one reason is because the retailer stocks similar products from several other CG companies. Another reason is because there is no actual OOS reporting system in place for the retailer.

CG companies, however, employ sales representatives responsible for visiting retail stores to ensure that business key performance indicators (KPIs) and objectives are met successfully. One example of the KPIs is to check for OOS events and rectify the same. Each sales representative may be responsible for up to a few hundred stores, and can typically only visit 5 stores in a day. Therefore, sales representatives typically plan their store visits in a 2-4 week cycle, but attempt to schedule store visits by prioritizing stores having a high OOS event probability. This causes the OOS event for a particular product to continue until the sales representative visits a store and attempts to correct the OOS event.

Failure to timely correct an OOS event is problematic as OOS events lasting 2-4 weeks obviously impact sale revenue for both the missing product and the store, especially if it is the top selling products that become out of stock. In addition, customers may opt for competitor products and such sales can be lost forever to competition.

Accordingly, what is needed is an improved method and system for predicting out of stock products.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

The following description describes implementations for a hierarchical neural network based implementation for predicting out of stock products. The hierarchical neural network uses different neural network layers and branches to process disparate sales data sources at different hierarchies into intermediate vectors representations without data aggregation (data loss) and then combines the vectors into a single vector. The single vector is then used to generate an out of stock probability for a particular product in a particular store within a predefined time window, e.g., 2 weeks-4 weeks, which may correspond to sales representative store visit cycle.

Figure 1:
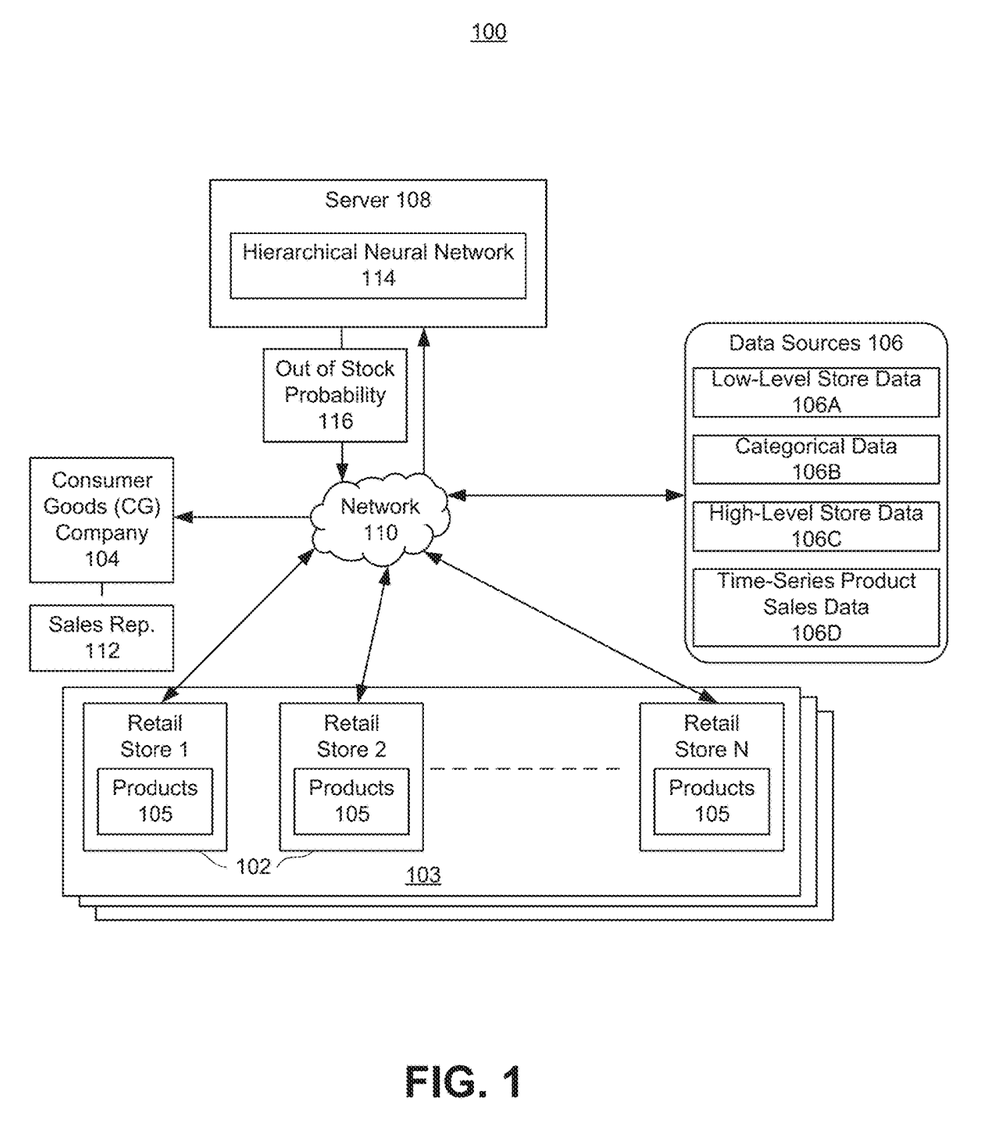
FIG. 1 illustrates a block diagram illustrating a system for predicting out of stock products using a hierarchical neural network.

FIG. 1 illustrates a block diagram illustrating a system for predicting out of stock products using a hierarchical neural network. The system 100 may include a plurality of retail stores 102 of one or more retailers 103 selling one or more products 105 of a consumer goods (CG) company 104. The system 100 further includes a plurality of data sources 106 representing sales data of the retail stores 102, where the data sources 106 are accessible by a computer device having one or more processors, including but not limited to, a server 108. Computer systems of the retail stores 102, the CG company 104 and the data sources 106 may be communicatively coupled to a network 110 such as the Internet. For example, the retail stores 102 may report and store product sales and other sales-related information data within the data sources 106. In one implementation, the data sources 106 may be stored remotely from the CG company 104 (as shown), while in another implementation, the data sources 106 may be stored on-site at the CG company 104.

The computer systems of the retail stores 102 may place orders for additional products 103 of the CG company 104 when a given product 105 at a certain retail store 102 falls below a certain level. When the product 105 is no longer present in the retail store 102, an out of stock (OOS) event for that product in that retail store 102 occurs.

The CG company 104 includes a sales representative 112 who are responsible for visiting the retail stores 102 to ensure that business key performance indicators (KPIs) are met and to check for OOS events. The sales representatives 112 typically plan their store visits on a periodic cycle, which may be a 2-4 week cycle, for example. Retail store visits may be scheduled by prioritizing stores having a high OOS event probability. Conventionally, the sales representative 112 may use an out of stock (OOS) event model (not shown) to predict the probability of an OOS event product in a store in next visit cycle, and the OOS event model is created using information from the data sources 106.

However, one problem is that the data sources 106 include disparate datasets having different data hierarchies, meaning each data sources may have a different level of attribute detail. In one example implementation, the data sources 106 may include low-level data 106A, categorical data 106B, high-level store data 106C, and time-series product sales data 106D. The low-level data 106A may include daily store visit KPIs and past occurrences of out of stock products, where the daily retail store visits KPIs may include: retailer/store ID, store date of visit, facing (e.g., the number of products on a shelf), shelf reset (restock) and past out of stock flags). In a further implementation, the low-level data 106A may also include promotion data such as a store ID, product ID, discounted price, promotion dates, and promotion activity.

The categorical data 106B may include data such as store identifiers (IDs) 106B-1 and associated cities identifiers (IDs) 106B-2, and may include other data (e.g., retailer ID, age, city, region, sales rep, etc.). The high-level store data 106C may include store-level product data 106C-1, which may include price, category, brand information. And the time-series product sales data 106D may include monthly or weekly product sales data 106D-1 (e.g., sales per product) and may include retailer ID, product ID, month, units sold, and sell price information.

The OOS event model is typically created using tree-based machine learning (ML) models such as random forests and gradient boosted trees. To overcome the disparate datasets having different data hierarchies when creating the OSS event model, the data is typically aggregated to bring all data sources to same level before being input into the tree-based ML models. While this approach provides satisfactory performance, it discards lots of useful information which can improve the performance. That is, aggregated data discards useful granular information and are selected rather arbitrarily.

For example, daily store visit data 106A-1 is an important feature, but tree-based models may aggregate the visit data 106A-1 to number_of_visits_x_days, where x is 7 days, 15 days, 30 days, or 60 days. Similarly, daily past occurrences of out of stock products may be aggregated to number_OOS_x_days where x is 7 days, 15 days, 30 days, 60 days and so on.

Product sales data 106D-1 may be stored as monthly/weekly sales per store/per product, but traditional tree-based models are limited to aggregating the product sales data to average sales multiple months, e.g., in last 3 months. The time-series product sales data 106D-1 is useful for OOS event prediction, as a high sale volume indicates a higher demand for products and thus an increased likelihood of OOS event. One insight within the data is that OOS events are more likely to occur mostly on the weekends. However, since tree-based models aggregate the sales data into average sales in last 3 months, the daily store visit data is discarded as is the ability to analyze weekend data.

Relatedly, the categorical data 106B, which is of high cardinality, is either discarded or learned through mean encoding. High cardinality categorical data like city and retail store names are often discarded as they cannot be one hot encoded. An alternative is to use a single aggregated numeric feature like OOS_rate_cityX or OOS_rate_storeX. However this again discards useful information like interaction of these variables with other features.

In summary, conventional tree-based models process all the data sources 106 in the same manner, even though some data sources or more granular or complex than others in need more processing to extract useful patterns. This may result in the OOS predictions generated by the tree-based models being inaccurate.

According to the disclosed implementations, the system 100 utilizes a hierarchical neural network 114 executed by the server 108 for joint learning on the disparate data sources 106 having different data hierarchies without data loss. The hierarchical neural network 114 uses different neural network layers and branches to process the data sources 106 into intermediate vectors representations without data aggregation (data loss) and then combines the vectors into a single vector. The single vector is then used to generate an out of stock probability 116 for a particular product in a particular store within a predefined time window corresponding with the sales representative store visit cycle, e.g., 2 weeks-4 weeks and the like. The out of stock probability 116 may then be sent over the network 110 to the CG company 104 or directly to the sales representative 112 using any suitable type of electronic communication (SMS, email, etc.).

In one implementation, the server 108 executing the hierarchical neural network 114 may be controlled by the CG company 104, one of the retailers 103, or by a third party service provider. In the implementation where the server 108 is provided by a third party service provider, the data sources 106 may integrated into database systems of the third party. The data sources 106 may be: i) stored in a data center of the service provider (e.g., Salesforce and the like), ii) stored by a cloud service provider (e.g., AWS, Google Cloud, Azure, etc.), iii) stored local to the server 108, rather than over the network, or iv) stored by a computer system of the retailer 103 or the CG company 104.

Figure 2:
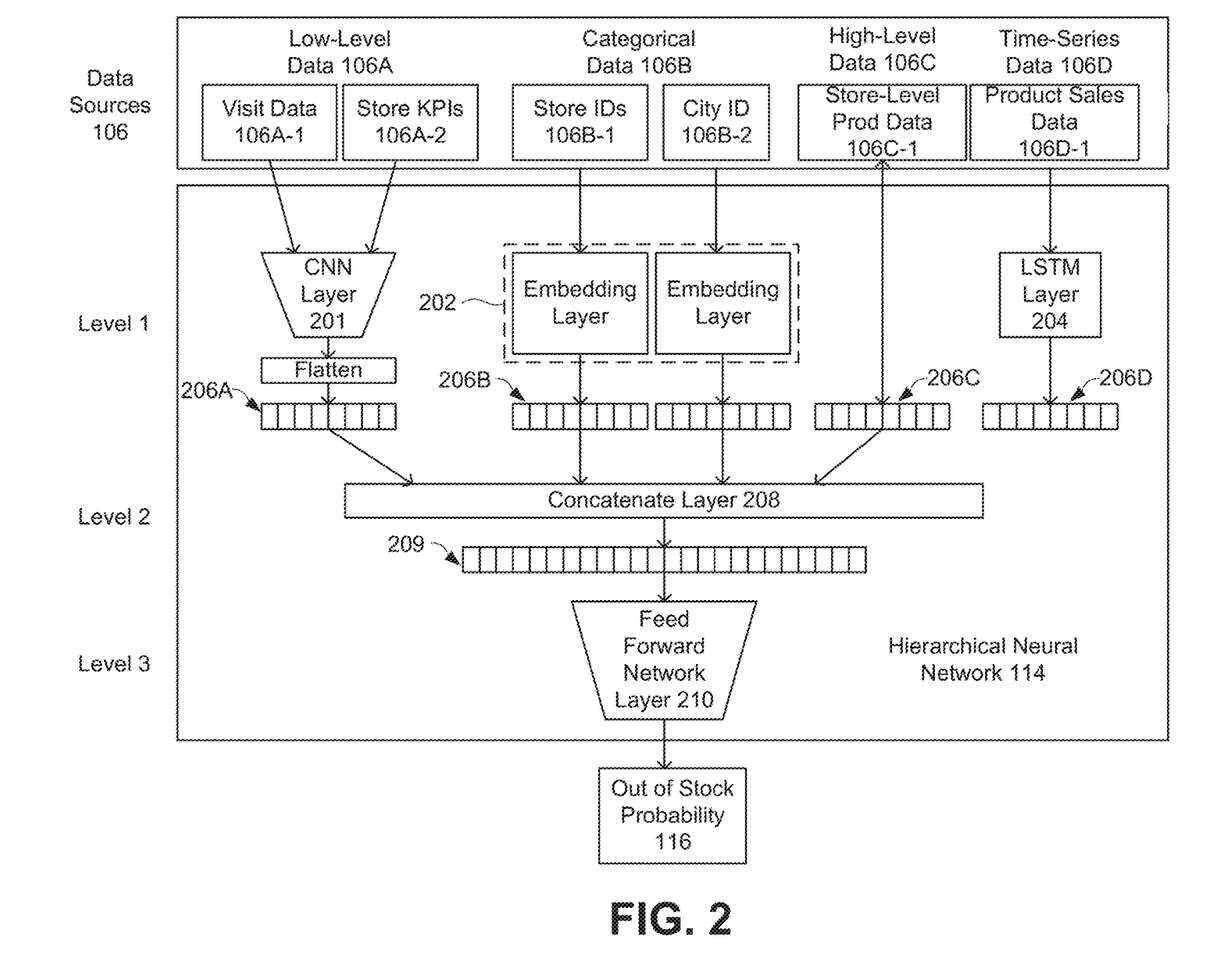
FIG. 2 illustrates a block diagram of components comprising the hierarchical neural network.

FIG. 2 illustrates a block diagram of components comprising the hierarchical neural network 114, where like components from FIG. 1 have like reference numerals. According to one implementation, the hierarchical neural network 114 comprises multiple levels of different types of neural networks. As is will be appreciated, a neural network may be defined as a computing system comprising a number of highly interconnected elements or nodes, called 'neurons', which are organized in layers to process information using dynamic state responses to external inputs. Neural networks are typically used to find patterns that are too complex for being manually extracted and are taught to recognize the patterns from the data.

In the example shown, data from the data source sources 106 is directly inputted and processed by a corresponding neural network, primarily in level 1. The neural networks may comprise artificial input neurons that access, receive, and input the data from the data sources 106. The input neurons may translate the input data into embedding or initial vector representations. An embedding is a mapping of a discrete categorical variable to a vector of continuous numbers. In the context of neural networks, embeddings are low-dimensional, learned continuous vector representations of discrete variables. Neural network embeddings are useful because they can reduce the dimensionality of categorical variables and represent categories in the transformed space. Ideally, an embedding or vector representation captures some of attributes of the input data by placing similar inputs close together in the embedding or vector space.

Level 1 of the hierarchical neural network 114 may comprise a convolutional neural network (CNN) layer 201 assigned to process the low-level data 106A, one or more embedding layers 202 assigned to process the categorical data 106B, and a long short-term memory (LSTM) layer 204 assigned to process the time-series data 106D. As used herein, a CNN is a class of artificial neural network that are also known as shift invariant or space invariant artificial neural networks (SIANN), based on a shared-weight architecture of the convolution kernels or filters that slide along input features and provide translation equivariant responses known as feature maps. An LSTM is an artificial recurrent neural network (RNN) architecture used in the field of deep learning. Unlike a standard feedforward neural networks, an LSTM has feedback connections and can process not only single data points (such as images), but also entire sequences of data, e.g., time series data.

The outputs of the neural networks from level 1 comprise respective intermediate vector representations 206A-206D. One exception to the above description is that the store-level product data 206C representing retail store/account level features (e.g., store size, store category, store potential, outlet class, store age in months, and retail chain name), are features that do not require any pre-processing and can be directly input to the concatenate layer 208. The intermediate vector representations from 206A-206D are input to level 2 of the hierarchical neural network 114 along with the store-level product data 206C. Level 2 may comprise a concatenate layer 208 that receives and concatenates the outputs from level 1. And level 3 may comprise a feed forward network layer 210 that receives the output from level 2, thereby connecting all the branches of the hierarchical neural network 114, and produces the out of stock probability 116.

Figure 3:
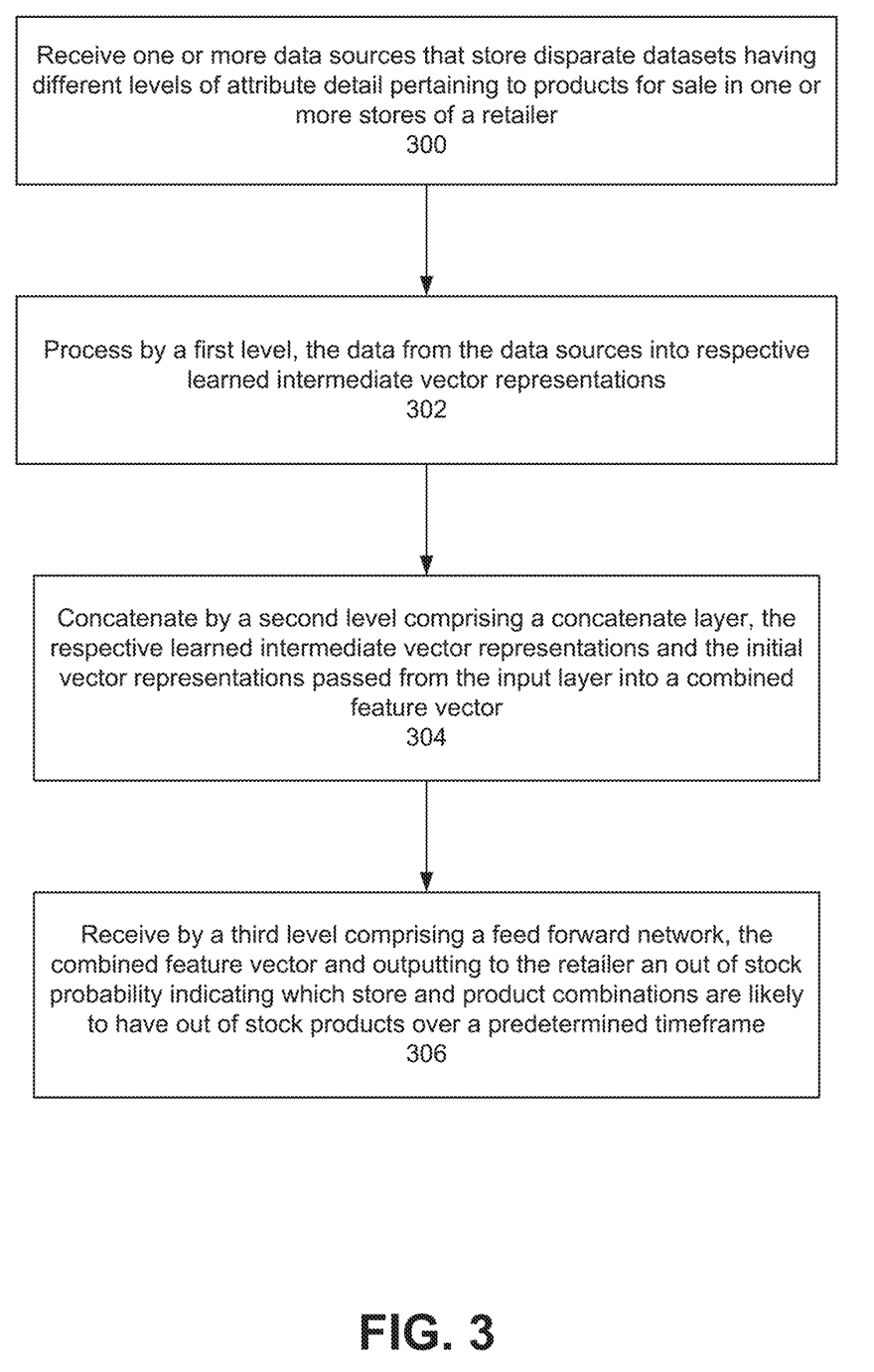
FIG. 3 illustrates a flow diagram of the process performed by the hierarchical neural network.

FIG. 3 illustrates a flow diagram of the process performed by the hierarchical neural network. Referring to both FIGS. 2 and 3, the process may begin by the input layer 200 receiving data from one or more data sources 106 that store disparate datasets having different levels of attribute detail pertaining to products for sale in one or more stores of a retailer, where the disparate datasets may comprise: low-level store data including daily store visits and past occurrences of out of stock products, categorical data including store identifiers and associated cities, store-level product data, and time-series product sales data including monthly or weekly sales per product (block 300).

The first level (level 1) then processes data from the one or more data sources 106 into respective learned intermediate vector representations (block 302), where the first level may comprise the CNN layer 201 to process the low-level data 106A, the embedding layer 202 to process the categorical data; and the LSTM layer 204 to process the time-series product sales data.

Figure 4:
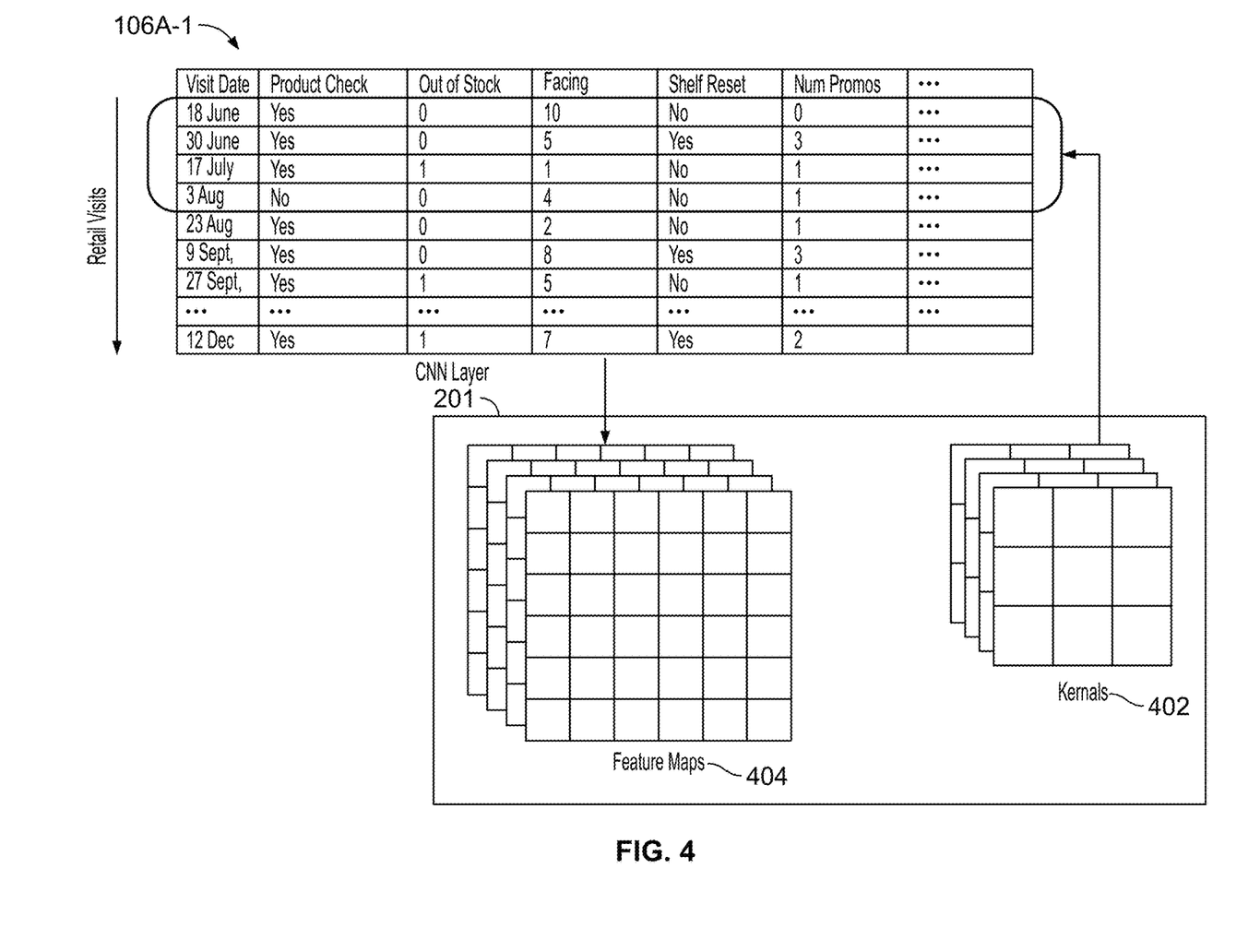
FIG. 4 is a diagram illustrating an example of the low-level data processed by the CNN layer.

FIG. 4 is a diagram illustrating an example of the low-level data 106A processed by the CNN layer 201. The low-level data 106A, which includes visit data 106A-1 and promotion data, is sequential in nature. Rather than aggregating the low-level data 106A, which would discard useful granular information, the CNN layer 201 is used to process the low-level data 106A directly to preserve the granular information. In this example, visit data 106A-1 shows details of retail store visits and may include columns for visit KPI data, such as visit date, a product check flag, an out of stock flag, facing (e.g., the number of products on a shelf facing the customers), shelf reset, number of promotions, and the like.

Visit KPI data is captured at a daily level and provides a snapshot of each a store's performance a single snapshot visit data can be treated as an image. The CNN layer 201 is based on a shared-weight architecture of convolution kernels 402 or filters that slide along visit data 106A-1 features and the visit data is convolved with one the kernels 402 to provide feature maps 404, each of which learn different relevant features. Instead of processing arbitrary selected features, as done conventionally, the CNN layer 201 learns useful features from data itself. The CNN layer 201 processes low-level granular and sequential features to extract useful information for predicting out of stocks, such as historical store visits.

According to another aspect of the disclosed implementations, the hierarchical neural network 114 uses embedding layers 202 to process high cardinality categorical data 106B, such as city and store names, by learning vector representations of each category from the data. That is, a respective embedding layer 202 is used to process store IDs 106B-1 and city IDs 106B-2, and the embedding layers 202 capture useful information such as interaction of the stores and cities with other variables. This is in contrast to traditional tree-based systems that typically discard such high cardinality categorical features.

Figure 5A:
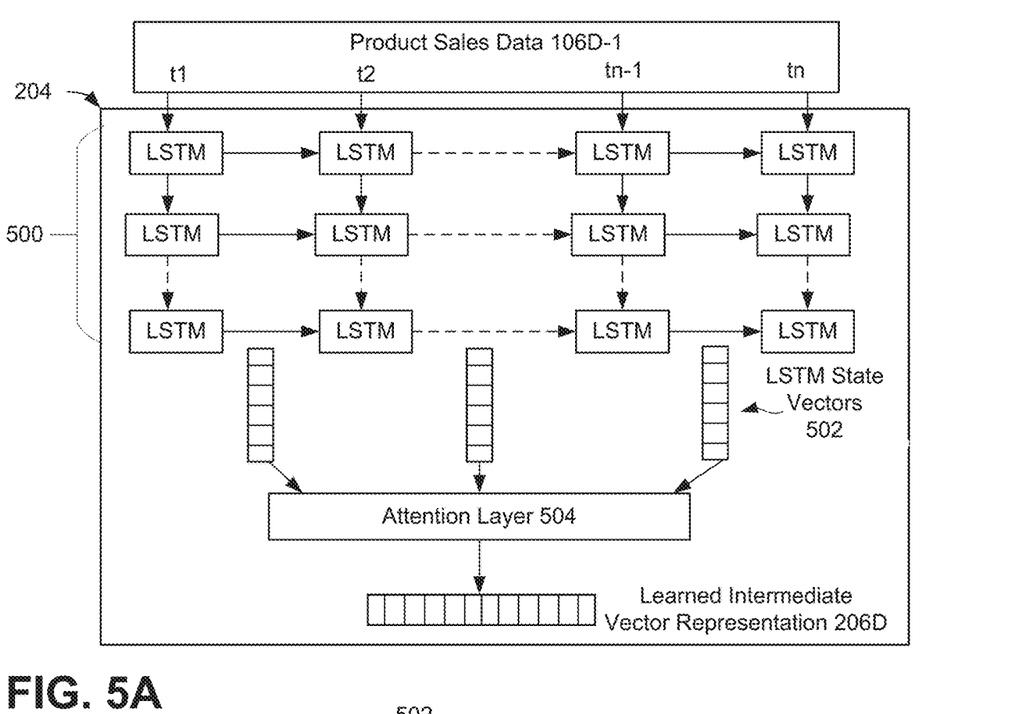
FIG. 5A is a diagram illustrating processing by the LSTM layer to process product sales data according to a further aspect of the disclosed implementations.

FIG. 5A is a diagram illustrating processing by the LSTM layer 204 to process product sales data 106D-1 according to a further aspect of the disclosed implementations. The hierarchical neural network 114 uses the LSTM layer 204 to process, classify and make predictions based on the time-series product sales data 106D-1, since there can be lags of unknown duration between important events in a time series. The product sales data 106D-1 comprises a multi-variance time-series on a weekly or monthly scale (t1-tn). In one implementation, the product sales data 106D-1 is used for both: i) current month sales volume for a store and a product or ii) next month's projected sales volume for a store and a product. The product sales data 106D-1 is passed through stacked LSTM layers 500 to learn historical patterns, which are represented by LSTM state vectors 502. The LSTM state vectors 502 are fed into an LSTM attention layer 504 that enables the LSTM layer 204 to examine data from a pre-defined time period relevant to generating the OOS probability.

Figure 5B:
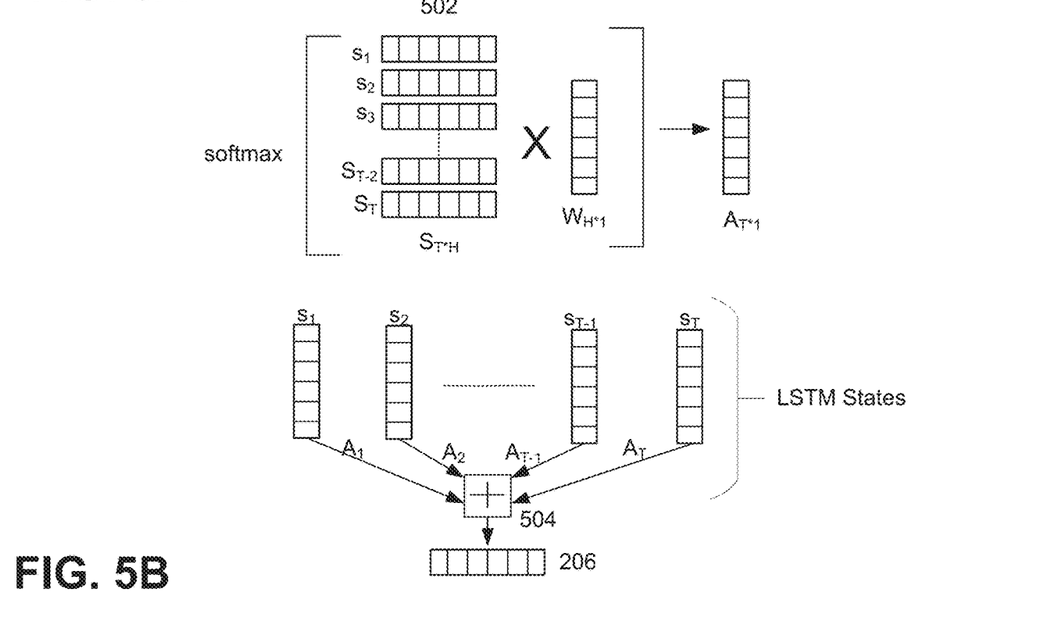
FIG. 5B is a diagram illustrating further details of the LSTM attention layer.

FIG. 5B show further details of the LSTM attention layer 504. The attention layer 504 inputs the LSTM state vectors 502 $s_1, s_2, \ldots s_T$ as a matrix $S_{T*H}$ and computes scores using a dot product of LSTM states vectors 502 with an attention weight vector $W_{H*1}$ to provide raw scores. The raw scores are then passed through a softmax function to convert the raw scores into probabilities called attention scores $A_T$:

$$R_{T*1} = S_{T*H} * W_{H*1}$$

$$A_{T*1} = \text{softmax}(R),$$

where S is the matrix of dimension T*H containing "T" hidden states: $[s_1, s_2, \ldots s_T]$ and H is the dimension of each hidden state; W is a column vector of size H*1 that is learned by the model; R is a column vector of raw attention scores; and A is the column vector with final attentions scores, i.e., $A = [a_1, a_2, \ldots a_T]$. The attention scores in A are used by attention layer 504 to compute a weighted sum of the LSTM states to produce the output learned intermediate vector representation 206D. The resulting learned intermediate vector representation 206D is fed to the downstream network where it is combined with other inputs generate the OOS probability 116.

The outputs of the neural networks from level 1 comprise respective learned intermediate vector representations 206A, 206B and 206D. The learned intermediate vector representations 206A, 206B and 206D are input to level 2 comprising the concatenate layer 208. At the second level (Level 2), the concatenate layer 208 concatenates the respective learned intermediate vector representations 206A, 206B and 206D into a single combined vector representation 209. In a further implementation, the initial vector representations 206C passed through from the input layer 200 are input to the concatenate layer 208 and concatenated with the learned intermediate vector representations 206A, 206B and 206D into the combined vector representation 209.

The third level (Level 3) may comprise a feed forward network layer 210 that receives the combined vector representation and outputs to the retailer 103 an out of stock probability 116 indicating which store and product combinations are likely to have out of stock products over a predetermined timeframe. A feedforward neural network is an artificial neural network where connections between nodes do not form a cycle such that information moves only forward from input nodes, through hidden nodes (if any) and to output nodes.

In one implementation, OOS probability 116 predicts whether a particular product at a particular store will experience an OOS event within the next store visit cycle (2 weeks-4 weeks). In one implementation, the feed forward network layer 210 may include a sigmoid or activation function that receives a number and outputs a probability of 0 or 1. For example, if a product at a particular store over the predetermined timeframe is predicted to be out of stock, then the sigmoid function will output a 1, and if the product is predicted not to be out of stock, it may output a 0.

According to the disclosed implementations, the hierarchical neural network 114 uses a suitable processing module/branch for each data source: CNN layer 201 for granular low-level (daily) data 106A, embedding layers 202 for high cardinality categorical data 106B, a concatenate layer 208 for high-level data 106C (store-level features), and a LSTM layer to process time-series (product sales) data 106, where all the all the branches are connected and passed through feed forward network layer 210 (i.e., a fully connected dense layer). The hierarchical neural network 114 dispenses with the need for manually crafted or hardcoded feature engineering. Instead, the hierarchical neural network 114 learns all relevant features from the data sources 106 and all layers are trained together to generate the out of stock probability 116, thereby providing joint end-to-end learning. This additional complexity results in better performance compared to tree-based models at least because the data is not aggregated so there is no data loss.

Example Electronic Devices and Environments

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 6A:
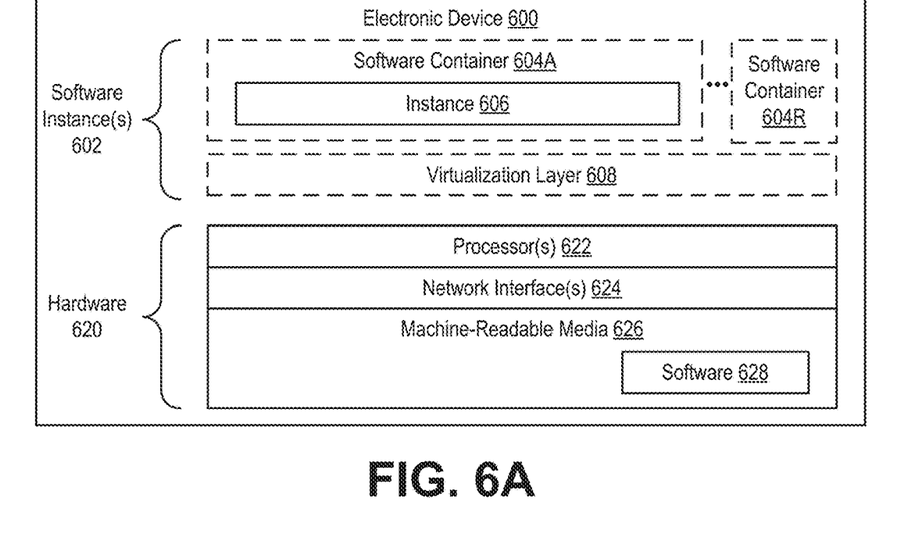
FIG. 6A is a block diagram illustrating an electronic device according to some example implementations.

FIG. 6A is a block diagram illustrating an electronic device 600 according to some example implementations. FIG. 6A includes hardware 620 comprising a set of one or more processor(s) 622, a set of one or more network interfaces 624 (wireless and/or wired), and machine-readable media 626 having stored therein software 628 (which includes instructions executable by the set of one or more processor(s) 622). The machine-readable media 326 may include non-transitory and/or transitory machine-readable media. Each of the previously described clients and the hierarchical neural network service may be implemented in one or more electronic devices 600. In one implementation: 1) each of the clients is implemented in a separate one of the electronic devices 600 (e.g., in end user devices where the software 628 represents the software to implement clients to interface directly and/or indirectly with the hierarchical neural network service (e.g., software 628 represents a web browser, a native client, a portal, a command-line interface, and/or an application programming interface (API) based upon protocols such as Simple Object Access Protocol (SOAP), Representational State Transfer (REST), etc.)); 2) the hierarchical neural network service is implemented in a separate set of one or more of the electronic devices 600 (e.g., a set of one or more server devices where the software 628 represents the software to implement the hierarchical neural network service); and 3) in operation, the electronic devices implementing the clients and the hierarchical neural network service would be communicatively coupled (e.g., by a network) and would establish between them (or through one or more other layers and/or or other services) connections for submitting data to the hierarchical neural network service and returning the OOS probability. Other configurations of electronic devices may be used in other implementations (e.g., an implementation in which the client and the hierarchical neural network service are implemented on a single one of electronic device 600).

During operation, an instance of the software 628 (illustrated as instance 606 and referred to as a software instance; and in the more specific case of an application, as an application instance) is executed. In electronic devices that use compute virtualization, the set of one or more processor(s) 622 typically execute software to instantiate a virtualization layer 608 and one or more software container(s) 604A-604R (e.g., with operating system-level virtualization, the virtualization layer 608 may represent a container engine (such as Docker Engine by Docker, Inc. or rkt in Container Linux by Red Hat, Inc.) running on top of (or integrated into) an operating system, and it allows for the creation of multiple software containers 604A-304R (representing separate user space instances and also called virtualization engines, virtual private servers, or jails) that may each be used to execute a set of one or more applications; with full virtualization, the virtualization layer 608 represents a hypervisor (sometimes referred to as a virtual machine monitor (VMM)) or a hypervisor executing on top of a host operating system, and the software containers 604A-304R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 628 is executed within the software container 604A on the virtualization layer 608. In electronic devices where compute virtualization is not used, the instance 606 on top of a host operating system is executed on the "bare metal" electronic device 600. The instantiation of the instance 606, as well as the virtualization layer 608 and software containers 604A-304R if implemented, are collectively referred to as software instance(s) 602.

Alternative implementations of an electronic device may have numerous variations from that described above. For example, customized hardware and/or accelerators might also be used in an electronic device.

Example Environment

Figure 6B:
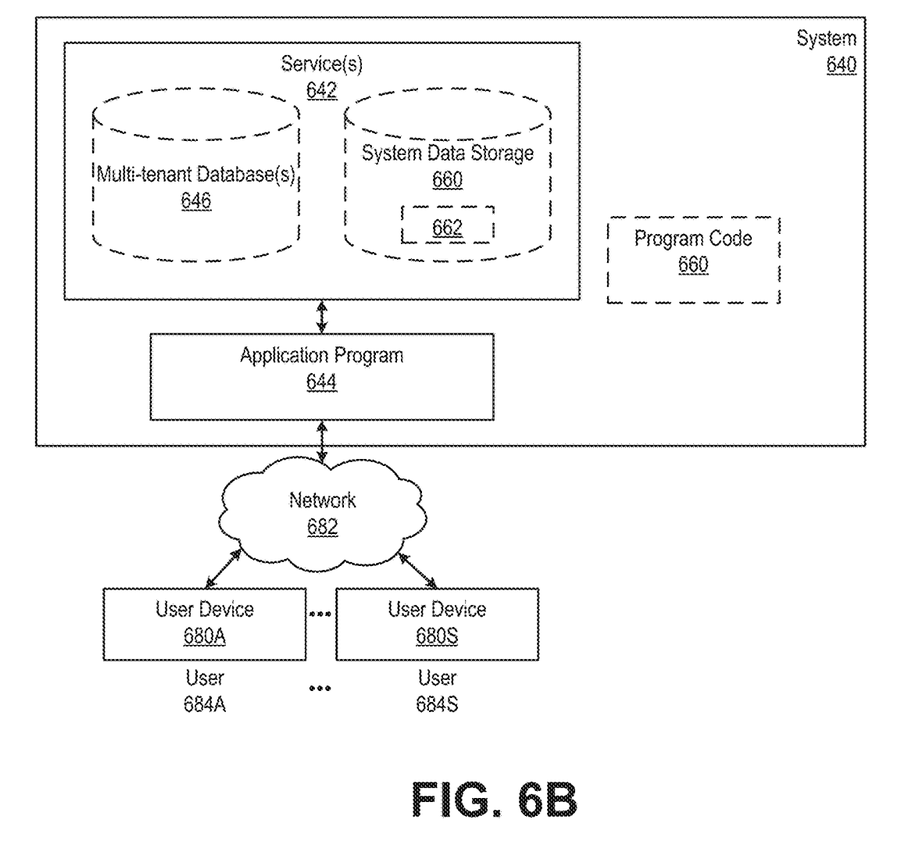
FIG. 6B is a block diagram of a deployment environment according to some example implementations.

FIG. 6B is a block diagram of a deployment environment according to some example implementations. A system 640 includes hardware (e.g., a set of one or more server devices) and software to provide service(s) 642, including the hierarchical neural network service. In some implementations the system 640 is in one or more datacenter(s). These datacenter(s) may be: 1) first party datacenter(s), which are datacenter(s) owned and/or operated by the same entity that provides and/or operates some or all of the software that provides the service(s) 642; and/or 2) third-party datacenter(s), which are datacenter(s) owned and/or operated by one or more different entities than the entity that provides the service(s) 642 (e.g., the different entities may host some or all of the software provided and/or operated by the entity that provides the service(s) 642). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 640 is coupled to user devices 680A-680S over a network 682. The service(s) 642 may be on-demand services that are made available to one or more of the users 684A-384S working for one or more entities other than the entity which owns and/or operates the on-demand services (those users sometimes referred to as outside users) so that those entities need not be concerned with building and/or maintaining a system, but instead may make use of the service(s) 642 when needed (e.g., when needed by the users 684A-384S). The service(s) 642 may communicate with each other and/or with one or more of the user devices 680A-680S via one or more APIs (e.g., a REST API). In some implementations, the user devices 680A-680S are operated by users 684A-384S, and each may be operated as a client device and/or a server device. In some implementations, one or more of the user devices 680A-680S are separate ones of the electronic device 600 or include one or more features of the electronic device 600.

In some implementations, the system 640 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 640 is a multi-tenant cloud computing architecture supporting multiple services, such as one or more of the following types of services: Hierarchical Neural Networkd; Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM). For example, system 640 may include an application platform '344 that enables PAAS for creating, managing, and executing one or more applications developed by the provider of the application platform '344, users accessing the system 640 via one or more of user devices 680A-680S, or third-party application developers accessing the system 640 via one or more of user devices 680A-680S.

In some implementations, one or more of the service(s) 642 may use one or more multi-tenant databases '346, as well as system data storage '350 for system data '352 accessible to system 640. In certain implementations, the system 640 includes a set of one or more servers that are running on server electronic devices and that are configured to handle requests for any authorized user associated with any tenant (there is no server affinity for a user and/or tenant to a specific server). The user devices 680A-680S communicate with the server(s) of system 640 to request and update tenant-level data and system-level data hosted by system 640, and in response the system 640 (e.g., one or more servers in system 640) automatically may generate one or more Structured Query Language (SQL) statements (e.g., one or more SQL queries) that are designed to access the desired information from the multi-tenant database(s) '346 and/or system data storage '350.

In some implementations, the service(s) 642 are implemented using virtual applications dynamically created at run time responsive to queries from the user devices 680A-680S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code '360 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 644 includes an application setup mechanism that supports application developers' creation and management of applications, which may be saved as metadata by save routines. Invocations to such applications, including the hierarchical neural network service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 682 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 640 and the user devices 680A-680S.

Each user device 680A-680S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 640. For example, the user interface device can be used to access data and applications hosted by system 640, and to perform searches on stored data, and otherwise allow one or more of users 684A-384S to interact with various GUI pages that may be presented to the one or more of users 684A-384S. User devices 680A-680S might communicate with system 640 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 680A-680S might include an HTTP client, commonly referred to as a "browser," for sending and receiving HTTP messages to and from server(s) of system 640, thus allowing users 684A-384S of the user devices 680A-680S to access, process and view information, pages and applications available to it from system 640 over network 682.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A system for predicting out of stock (OOS) products, the system, comprising:
   one or more processors executing a hierarchical neural network (HNN), the HNN comprising:
   one or more data sources that store disparate datasets having different levels of attribute detail pertaining to products for sale in one or more stores of a retailer, the disparate datasets comprising:
   low-level store data including daily store visits and past occurrences of out of stock products, categorical data including store identifiers and associated city identifiers, store-level product data, and time-series product sales data including monthly or weekly sales per product;
   a first level that processes the low-level store data, the categorical data, the store-level product data, and the time-series product sales data from the one or more data sources into respective learned intermediate vector representations, the first level comprising:
   a convolutional neural network (CNN) layer that processes the low-level store data;
   an embedding layer that processes the categorical data;
   a long short-term memory (LSTM) layer that processes the time-series product sales data;
   a second level comprising a concatenate layer that concatenates the learned intermediate vector representations from the second level into a combined vector representation; and
   a third level comprising a feed forward network that receives the combined vector representation and outputs to the retailer an OOS probability indicating which store and product combinations are likely to have OOS products over a predetermined timeframe.

2. The HNN of claim 1, wherein the first level first translates the low-level store data, the categorical data, the store-level product data, and the time-series product sales data into initial vector representations.

3. The HNN of claim 2, wherein a set of initial vector representations representing the store-level product data are not processed by the first level but passed on to the second level.

4. The HNN of claim 3, wherein the concatenate layer concatenates the set of initial vector representations of the store-level product data with the respective learned intermediate vector representations.

5. The HNN of claim 1, wherein the CNN layer is based on a shared-weight architecture of convolution kernels that slide along the visit data and the visit data is convolved with one of the convolutions kernels to provide feature maps, where ones of the feature maps learn different features.

6. The HNN of claim 5, wherein the CNN layer includes a first attention layer such that the CNN layer processes low-level granular and sequential features and the first attention layer examines data from a predefined time period relevant to generating the OOS probability.

7. The HNN of claim 1, wherein the embedding layer processes the store identifiers and the city identifiers to capture information including interaction of the stores and cities with other variables.

8. The HNN of claim 1, wherein the LSTM layer includes stacked LSTM layers to learn historical patterns that are represented by LSTM state vectors, wherein the LSTM state vectors are fed into a second attention layer to enable the LSTM layer to examine data from a predefined time period relevant to generating the OOS probability.

9. The HNN of claim 1, wherein the one or more data sources are stored in: i) a data center of a service provider, ii) by a cloud service provider, iii) local to server comprising the one or more processors, or iv) by a computer system of the retailer or a consumer goods company.

10. A method for implementing a hierarchical neural network (HNN) for predicting out of stock (OOS) products, the HNN executed by a computer server, the method comprising:
   receiving one or more data sources that store disparate datasets having different levels of attribute detail pertaining to products for sale in one or more stores of a retailer, the disparate datasets comprising: low-level store data including daily store visits and past occurrences of out of stock products, categorical data including store identifiers and associated cities, store-level product data, and time-series product sales data including monthly or weekly sales per product;
   processing, by a first level, the low-level store data, the categorical data, the store-level product data, and the time-series product sales data from the one or more data sources into respective learned intermediate vector representations, the first level comprising:
      a convolutional neural network (CNN) to process the low-level store data, an embedding layer to process the categorical data; and a long short-term memory (LSTM) layer to process the time-series product sales data;
   concatenating, by a second level comprising a concatenate layer, the respective learned intermediate vector representations into a combined vector representation; and
   receiving, by a third level comprising a feed forward network, the combined feature vector representation and outputting to the retailer an OOS probability indicating which store and product combinations are likely to have OOS products over a predetermined timeframe.

11. The method of claim 10, further comprising translating the low-level store data, the categorical data, the store-level product data, and the time-series product sales data into initial vector representations.

12. The method of claim 10, further comprising generating a set of initial vector representations representing the store-level product data, and passing the set of initial vector representations on to the second level instead of the first level.

13. The method of claim 12, further comprising concatenating, by the concatenate layer, the set of initial vector representations of the store-level product data with the respective learned intermediate vector representations.

14. The method of claim 10, further comprising basing a CNN layer on a shared-weight architecture of convolution kernels that slide along the visit data and the visit data is convolved with one of the convolutions kernels to provide feature maps, where ones of the feature maps learn different features.

15. The method of claim 14, further comprising providing the CNN layer with a first attention layer such that the CNN layer processes low-level granular and sequential features and the first attention layer examines data from a predefined time period relevant to generating the OOS probability.

16. The method of claim 10, further comprising processing, by the embedding layer, the store identifiers and the city identifiers to capture information including interaction of the stores and cities with other variables.

17. The method of claim 10, further comprising providing the LSTM layer with stacked LSTM layers to learn historical patterns that are represented by LSTM state vectors, and feeding the LSTM state vectors into a second attention layer to enable the LSTM layer to examine data from a predefined time period relevant to generating the OOS probability.

18. The method of claim 10, further comprising storing the one or more data sources in: i) a data center of a service provider, ii) by a cloud service provider, iii) local to server comprising the one or more processors, or iv) by a computer system of the retailer or a consumer goods company.

19. A non-transitory machine-readable storage medium that provides instructions that, if executed by a processor are configurable to cause said processor to perform operations comprising:
   receiving data from one or more data sources that store disparate datasets having different levels of attribute detail pertaining to products for sale in one or more stores of a retailer, the disparate datasets comprising: low-level store data including daily store visits and past occurrences of out of stock (QOS) products, categorical data including store identifiers and associated cities, store-level product data, and time-series product sales data including monthly or weekly sales per product;
   processing, by a first level, the low-level store data, the categorical data, the store-level product data, and the time-series product sale data from the one or more data sources into respective learned intermediate vector representations, the first level comprising: a convolutional neural network to process the low-level store data, an embedding layer to process the categorical data; and a long short-term memory (LSTM) layer to process the time-series product sales data;

concatenating, by a second level comprising a concatenate layer, the respective learned intermediate vector representations into a combined vector representation; and receiving, by a third level comprising a feed forward network, the combined feature vector representation and outputting to the retailer an OOS probability indicating which store and product combinations are likely to have OOS products over a predetermined timeframe.

* * * * *